US012101616B2

(12) United States Patent
Yang et al.

(10) Patent No.: US 12,101,616 B2
(45) Date of Patent: Sep. 24, 2024

(54) SPEAKER

(71) Applicants: AAC Microtech (Changzhou) Co., Ltd., Changzhou (CN); AAC ACOUSTIC TECHNOLOGIES (SHENZHEN) CO., LTD., Shenzhen (CN)

(72) Inventors: Huhu Yang, Shenzhen (CN); Wei Wei, Shenzhen (CN); Zhaoyu Yin, Shenzhen (CN); Zhizhu Chen, Shenzhen (CN)

(73) Assignees: AAC Microtech (Changzhou) Co., Ltd., Changzhou (CN); AAC Acoustic Technologies (Shenzhen) Co., Ltd., Shenzhen (CN)

( * ) Notice: Subject to any disclaimer, the term of this patent is extended or adjusted under 35 U.S.C. 154(b) by 201 days.

(21) Appl. No.: 17/981,496

(22) Filed: Nov. 7, 2022

(65) Prior Publication Data

US 2023/0328445 A1 Oct. 12, 2023

(30) Foreign Application Priority Data

Apr. 6, 2022 (CN) ......................... 202220785034.6

(51) Int. Cl.
*H04R 9/02* (2006.01)

(52) U.S. Cl.
CPC .................................... *H04R 9/025* (2013.01)

(58) Field of Classification Search
CPC ...................................................... H04R 9/025
See application file for complete search history.

(56) References Cited

U.S. PATENT DOCUMENTS

2015/0222995 A1* 8/2015 Hori ........................ H04R 9/025
381/412
2018/0302724 A1* 10/2018 Li ............................ H04R 1/06
2019/0028804 A1* 1/2019 Zhao .................... H05K 7/1427

* cited by examiner

*Primary Examiner* — Suhan Ni
(74) *Attorney, Agent, or Firm* — W&G Law Group

(57) ABSTRACT

A speaker includes: a frame, a vibration system including a diaphragm, a voice coil, and a flexible circuit board, and a magnetic circuit system, wherein the flexible circuit board includes an outer fixing portion, an inner fixing portion, and an elastic connecting arm, the inner fixing portion includes a first fixing portion electrically connected with the elastic connecting arm, a second fixing portion bent and extended from the first fixing portion in a direction away from the diaphragm, and a third fixing portion bent and extended from an end of the second fixing portion away from the first fixing portion in a direction of the voice coil, the third fixing portion is provided with a pad which is electrically connected with a bottom surface of the voice coil. Compared with the related art, the speaker disclosed by the present disclosure has better acoustic performance.

8 Claims, 4 Drawing Sheets

SPEAKER

TECHNICAL FIELD

The present disclosure relates to an electro-acoustic device, in particular to a speaker used in portable electronic products.

BACKGROUND

A related speaker mainly includes a frame, a vibration system fixed to the frame, and a magnetic circuit system with a magnetic gap for driving the vibration system to vibrate and emit sounds.

The vibration system includes a diaphragm fixed to the frame, a voice coil located in the magnetic gap and driving the diaphragm to vibrate and emit sounds, and a flexible circuit board fixed to the frame and electrically connected to the voice coil. Pads on the flexible circuit board all face the diaphragm, the voice coil includes a first lead wire and a second lead wire, which are respectively the incoming and outgoing wires of the voice coil. The first lead wire and the second lead wire are respectively located at two opposite sides of the flexible circuit board. Therefore, the first lead wire is directly electrically connected to one pad on the flexible circuit board, and the second lead wire has to turn over and pass through a gap between the voice coil and the flexible circuit board, and then connect with another pad.

The consistency of the gap between the voice coil and the flexible circuit board of the speaker with this structure cannot be controlled, and the voice coil will push the pads outward, resulting in a risk of the separation of the voice coil and the flexible circuit board. In addition, an extra space for the voice coil lead wire to turn over is needed, which will occupy the internal space of the speaker and affect the acoustic performance of the speaker.

Therefore, it is a need to provide an improved speaker to solve the above problems.

SUMMARY

In view of the above, an objective of the present disclosure is to provide a speaker with better acoustic performance.

In order to achieve the objective mentioned above, the present disclosure discloses a speaker including: a frame, a vibration system fixed to the frame, including a diaphragm fixed to the frame, a voice coil, and a flexible circuit board fixed to the frame and electrically connected with the voice coil, and a magnetic circuit system for driving the vibration system to vibrate and emit sounds, fixed to the frame and including a magnetic gap, wherein the flexible circuit board includes an outer fixing portion fixedly connected with the frame, an inner fixing portion spaced apart from the outer fixing portion, and an elastic connecting arm connecting the outer fixing portion and the inner fixing portion, the inner fixing portion includes a first fixing portion electrically connected with the elastic connecting arm, a second fixing portion bent and extended from the first fixing portion in a direction away from the diaphragm, and a third fixing portion bent and extended from an end of the second fixing portion away from the first fixing portion in a direction of the voice coil, the third fixing portion is provided with a pad which is electrically connected with a bottom surface of the voice coil.

As an improvement, an amount of the flexible circuit boards is four, the four flexible circuit boards are respectively arranged at four corners of the frame, an amount of the pads is two, the two pads are respectively arranged on different flexible circuit boards.

As an improvement, the first fixing portion, the second fixing portion and the third fixing portion are configured as an integrated structure.

As an improvement, the second fixing portion is in contact with a side surface of the voice coil.

As an improvement, a width of the third fixing portion is the same as that of the bottom surface of the voice coil.

As an improvement, the magnetic circuit system includes a yoke, and a main magnet and a plurality of secondary magnets located on the yoke, the plurality of secondary magnets is located around the main magnet and forms the magnetic gap with the main magnet, a plurality of receiving spaces for receiving the flexible circuit boards is formed between adjacent secondary magnets.

As an improvement, the magnetic circuit system further includes a main pole plate located on the main magnet and a secondary pole plate located on the plurality of secondary magnets, the secondary pole plate is provided with a plurality of avoiding spaces respectively corresponding to the plurality of receiving spaces, and a projection of each flexible circuit board along the vibration direction of the diaphragm is at least partially located in a corresponding one of the avoiding spaces.

As an improvement, the frame includes a plurality of receiving grooves for accommodating the first fixing portions, and each first fixing portion is fixed in a corresponding one of the receiving grooves.

DESCRIPTION OF EMBODIMENTS

The technical solutions in embodiments of the present disclosure will be described clearly and completely below with reference to the accompanying drawings in the embodiments of the present disclosure.

Figure 1:
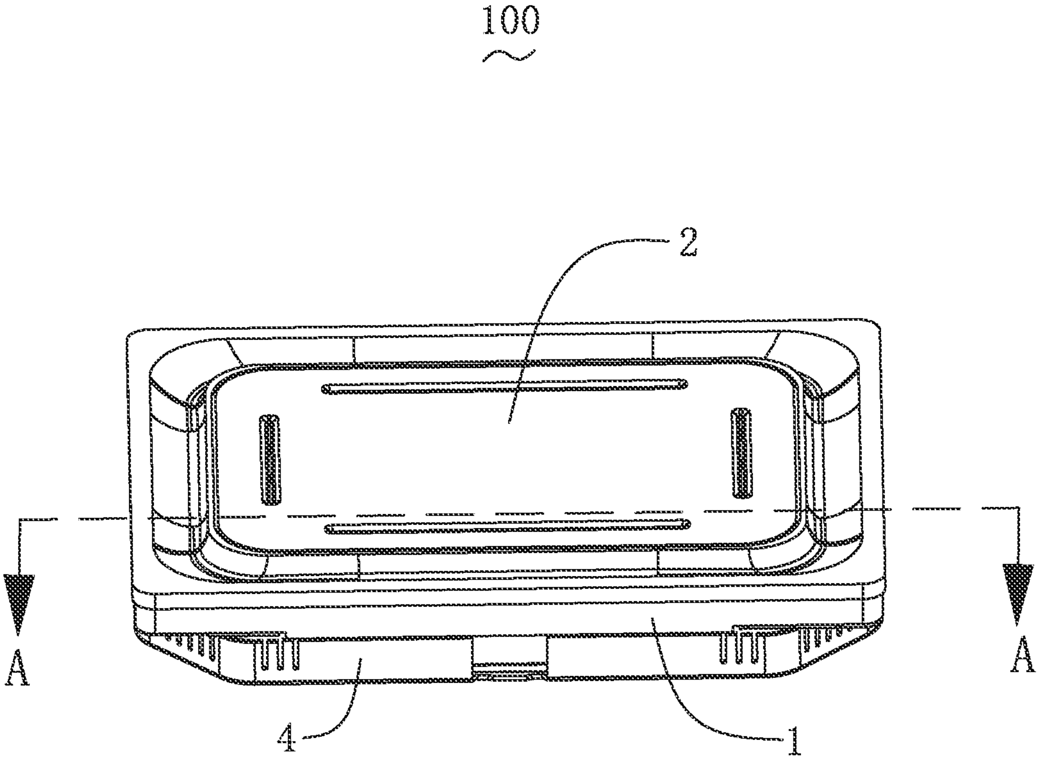
FIG. 1 is an isometric view of a speaker in accordance with an exemplary embodiment of the present disclosure.
Figure 2:
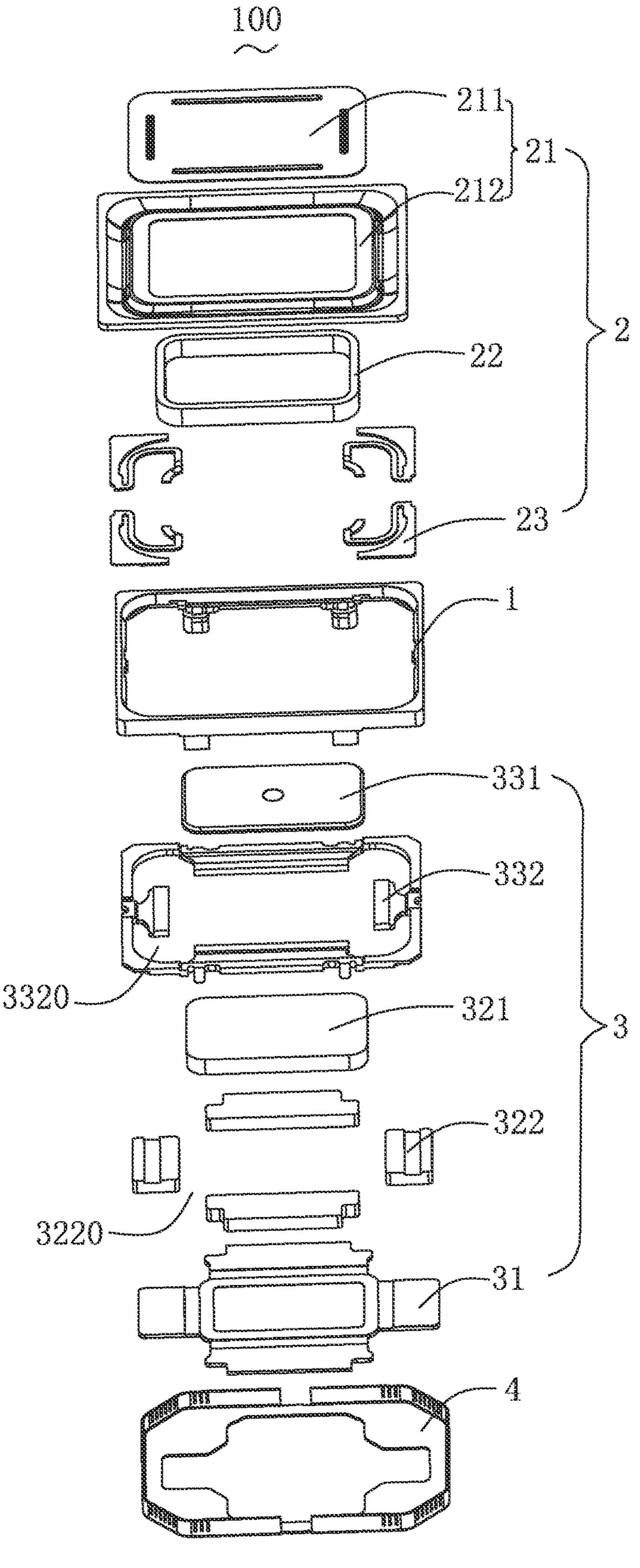
FIG. 2 is an exploded view of the speaker in FIG. 1.
Figure 3:
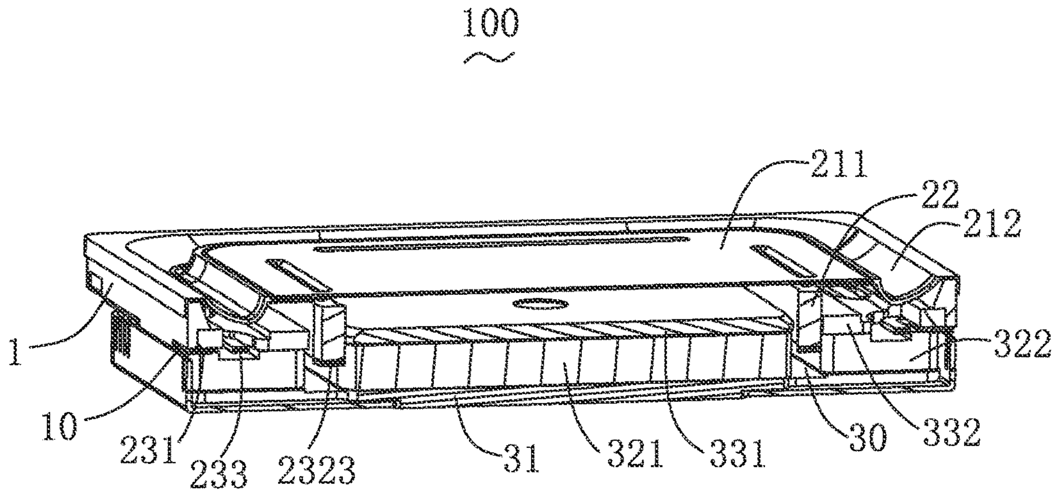
FIG. 3 is a cross-sectional view of the speaker taken along line A-A in FIG. 1.
Figure 4:
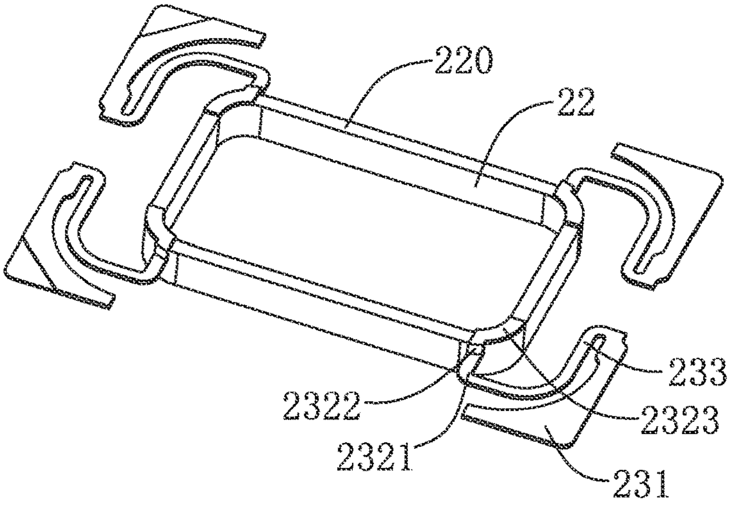
FIG. 4 is an illustrative assembled view of a voice coil and a flexible circuit board.
Figure 5:
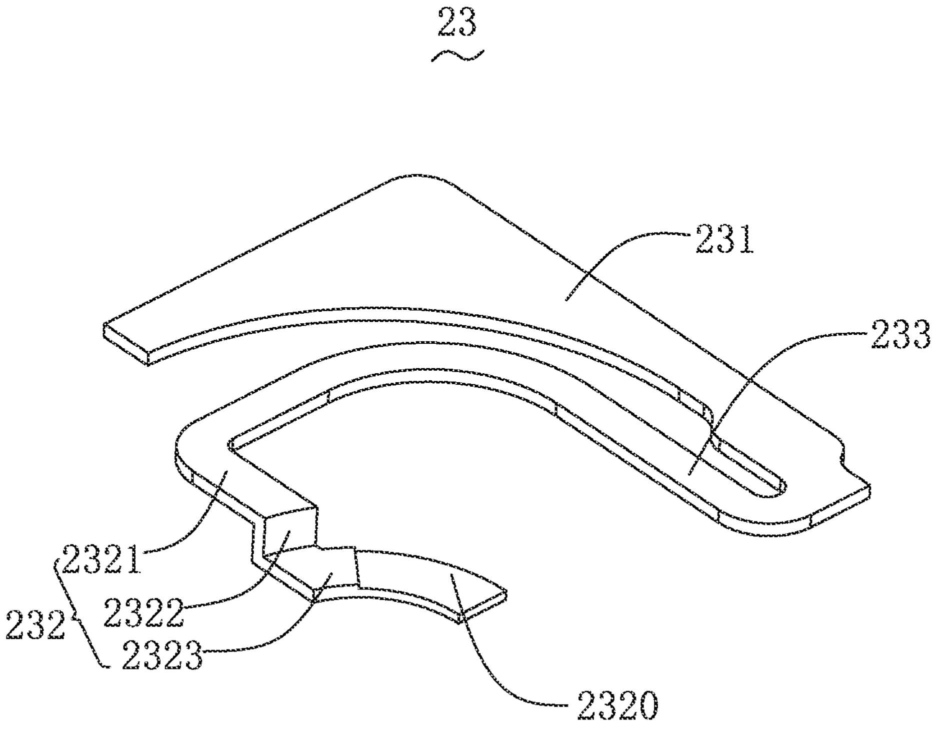
FIG. 5 is an isometric view of the flexible circuit board in the speaker in accordance with an exemplary embodiment of the present disclosure.

As shown in FIGS. 1-5, the present disclosure discloses a speaker 100. The speaker 100 includes a frame 1, a vibration system 2 fixed on the frame 1, and a magnetic circuit system 3 for driving the vibration system 2 to vibrate and emit sound, the magnetic circuit system includes a magnetic gap 30.

The vibration system 1 includes a diaphragm 21 fixed to the frame 1, a voice coil 22 located in the magnetic gap 30 and driving the diaphragm 21 to vibrate and emit sounds, and a flexible circuit board 23 fixed to the frame 1. The flexible circuit board 23 is electrically connected with the voice coil 22.

Optionally, the diaphragm 21 further includes a dome 211 in a center thereof and a suspension 212 connected with the dome 211.

The flexible circuit board 23 includes an outer fixing portion 231 fixedly connected with the frame 1, an inner fixing portion 232 spaced apart from the outer fixing portion 231, and an elastic connecting arm 233 connecting the outer fixing portion 231 and the inner fixing portion 232. The inner fixing portion 232 includes a first fixing portion 2321 electrically connected with the elastic connecting arm 233, a second fixing portion 2322 bent and extended from the first fixing portion 2321 in a direction away from the diaphragm 21, and a third fixing portion 2323 bent and extended from an end of the second fixing portion 2322 away from the first fixing portion 2321 in a direction of the voice coil 22, the third fixing portion 2323 is provided with a pad 2320 which is electrically connected with a bottom surface 220 of the voice coil 22. Optionally, an amount of the flexible circuit boards 23 is four, the four flexible circuit boards 23 are respectively arranged at four corners of the frame 1. In addition, an amount of the pads 2320 is two, the two pads 2320 are respectively arranged on two of the flexible circuit boards 23. The bottom surface 220 of the voice coil 22 is also provided with an incoming wire and an outgoing wire, and the two pads 2320 are electrically connected to the incoming wire and the outgoing wire of the bottom surface 220 of the voice coil 22 respectively. Therefore, the pads 2320 on the flexible circuit boards 23 are directly electrically connected to the incoming and outgoing wires of the bottom surface 220 of the voice coil 22, thereby saving the space for the pads of the flexible circuit boards 23 outside the voice coil 22, and the magnetic circuit system 3 can be made larger, which improves the performance of the product. In addition, since the flexible circuit board 23 is connected to the bottom surface 230 of the voice coil 22, the voice coil 22 can also be fixedly supported by the flexible circuit board; the elastic connecting arm 233, the first fixing portion 2321 and the second fixing portion 2322 of each flexible circuit board 23 can entirely be used as the lever arm of the flexible circuit board 23, and an increase in the stroke of the lever arm can improve the life of the flexible circuit board 23.

The first fixing portion 2321, the second fixing portion 2322 and the third fixing portion 2323 are configured as an integrated structure. The second fixing portion 2322 is in contact with a side surface of the voice coil 22 and supports and fixes with the voice coil 22. A width of the third fixing portion 2323 is the same as that of the bottom surface 220 of the voice coil 22, which can maximize the welding and fixing functions.

Optionally, the magnetic circuit system 3 includes a yoke 31, a main magnet 321 and a plurality of secondary magnets 322 located on the yoke 31, a main pole plate 331 located on the main magnet 321 and a secondary pole plate 332 located on the plurality of secondary magnets 322. The plurality of secondary magnets 322 is located on around the main magnet 321 and forms the magnetic gap 30 with the main magnet 321, an amount of the secondary magnets 322 is four, and the plurality of secondary magnets 322 are arranged around the main magnet 321, each two of the four secondary magnets are opposite to each other, a plurality of receiving spaces 3220 for receiving the flexible circuit boards 23 is formed between adjacent secondary magnets 322. The secondary pole plate 332 is a hollow annular structure, the secondary pole plate 332 is provided with a plurality of avoiding spaces 3320 arranged at corners of the secondary pole plate 332 and respectively corresponding to the plurality of receiving spaces 3220, and a projection of each flexible circuit board 23 along the vibration direction of the diaphragm 21 is at least partially located in a corresponding one of the avoiding spaces 3320. The plurality of avoiding spaces 3320 of the secondary pole plate 332 provides vibration spaces for the elastic connecting arm 2303 of each flexible circuit board 23.

In addition, the frame 1 includes a plurality of receiving grooves 10 for accommodating the first fixing portions 2301. The receiving grooves 10 are recessed along the direction of the diaphragm 21, and each first fixing portion 2301 is accommodated and fixed in the corresponding one of the receiving grooves 10.

Compared with the related art, the pads 2320 on the flexible circuit boards 23 are directly electrically connected to the incoming and outgoing wires of the bottom surface 220 of the voice coil 22, thereby saving the space for the pads of the flexible circuit boards 23 outside the voice coil 22, and the magnetic circuit system 3 can be made larger, which improves the performance of the product.

The above descriptions are merely some of the embodiments of the present disclosure. It should be pointed out that for those of ordinary skill in the art, improvements can be made without departing from the inventive concept of the present disclosure, shall fall within the scope of the present disclosure.

What is claimed is:

1. A speaker, comprising:

a frame, a vibration system fixed to the frame, comprising a diaphragm fixed to the frame, a voice coil, and a flexible circuit board fixed to the frame and electrically connected with the voice coil, and a magnetic circuit system for driving the vibration system to vibrate and emit sounds, fixed to the frame and comprising a magnetic gap, wherein the flexible circuit board includes an outer fixing portion fixedly connected with the frame, an inner fixing portion spaced apart from the outer fixing portion, and an elastic connecting arm connecting the outer fixing portion and the inner fixing portion, the inner fixing portion includes a first fixing portion electrically connected with the elastic connecting arm, a second fixing portion bent and extended from the first fixing portion in a direction away from the diaphragm, and a third fixing portion bent and extended from an end of the second fixing portion away from the first fixing portion in a direction of the voice coil, the third fixing portion is provided with a pad which is electrically connected with a bottom surface of the voice coil.

2. The speaker described as claim 1, wherein an amount of the flexible circuit boards is four, the four flexible circuit boards are respectively arranged at four corners of the frame, an amount of the pads is two, the two pads are respectively arranged on different flexible circuit boards.

3. The speaker described as claim 2, wherein the magnetic circuit system includes a yoke, and a main magnet and a plurality of secondary magnets located on the yoke, the plurality of secondary magnets is located around the main magnet and forms the magnetic gap with the main magnet, a plurality of receiving spaces for receiving the flexible circuit boards is formed between adjacent secondary magnets.

4. The speaker described as claim 3, wherein the magnetic circuit system further includes a main pole plate located on the main magnet and a secondary pole plate located on the plurality of secondary magnets, the secondary pole plate is provided with a plurality of avoiding spaces respectively corresponding to the plurality of receiving spaces, and a projection of each flexible circuit board along the vibration direction of the diaphragm is at least partially located in a corresponding one of the avoiding spaces.

5. The speaker described as claim 1, wherein the first fixing portion, the second fixing portion and the third fixing portion are configured as an integrated structure.

6. The speaker described as claim 1, wherein the second fixing portion is in contact with a side surface of the voice coil.

7. The speaker described as claim 1, wherein a width of the third fixing portion is the same as that of the bottom surface of the voice coil.

8. The speaker described as claim 1, wherein the frame includes a plurality of receiving grooves for accommodating the first fixing portions, and each first fixing portion is fixed in a corresponding one of the receiving grooves.

* * * * *